US006909924B2

(12) United States Patent
Kumamoto et al.

(10) Patent No.: US 6,909,924 B2
(45) Date of Patent: Jun. 21, 2005

(54) METHOD AND APPARATUS FOR SHIFTING PITCH OF ACOUSTIC SIGNALS

(75) Inventors: Yoshinori Kumamoto, Fukuoka-Ken (JP); Naoyuki Katou, Iizuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 403 days.

(21) Appl. No.: 09/957,320

(22) Filed: Sep. 20, 2001

(65) Prior Publication Data

US 2002/0071575 A1 Jun. 13, 2002

(30) Foreign Application Priority Data

Sep. 22, 2000 (JP) ....................................... 2000-288349

(51) Int. Cl.7 ........................... G06F 17/00; G10H 7/00; G10H 1/06

(52) U.S. Cl. ............................. 700/94; 84/603; 84/622

(58) Field of Search .............................. 381/97; 84/603, 84/609, 622, 625, 659, 660, 661, 649, 627

(56) References Cited

U.S. PATENT DOCUMENTS 4,706,537 A * 11/1987 Oguri .......................... 84/746
5,369,725 A * 11/1994 Iizuka et al. ................ 704/207
5,687,240 A 11/1997 Yoshida et al.
6,360,198 B1 * 3/2002 Imai et al. .................. 704/207
6,470,309 B1 * 10/2002 McCree ...................... 704/207

FOREIGN PATENT DOCUMENTS

JP 60-176100 A1 9/1985
JP 5-297891 A1 11/1993
JP 05297891 A * 11/1993 ............. G10L/3/02
JP 2000-047700 A1 2/2000

OTHER PUBLICATIONS

Applicant's admitted prior art, Figures 8–12, pp. 2–6.*
Applicant's admitted prior art, Figures 8–12, pp. 2–6.*

* cited by examiner

*Primary Examiner*—Sinh Tran
*Assistant Examiner*—Devona E Faulk
(74) *Attorney, Agent, or Firm*—Darby & Darby

(57) ABSTRACT

A method for shifting a pitch of acoustic signals, which are expressed in terms of a series of digital signals, to an optional pitch, uses a compacting and/or expanding process on the time axis and cross-fades a fade-in acoustic signal, stored in a memory with a fade-out acoustic signal, also stored in memory. The compaction and/or expansion of the time axes minimizes phase differences between the fade-in and fade-out acoustic signals to minimize tremolo in the output signal. The reduction in phase difference employs fundamental tones of the two series of signals selected by low-pass filtering the acoustic signal. One embodiment performs two-step compensation with a rough compensation using blocks of the digital signals and a fine compensation using samples from blocks.

12 Claims, 13 Drawing Sheets

Prior Art
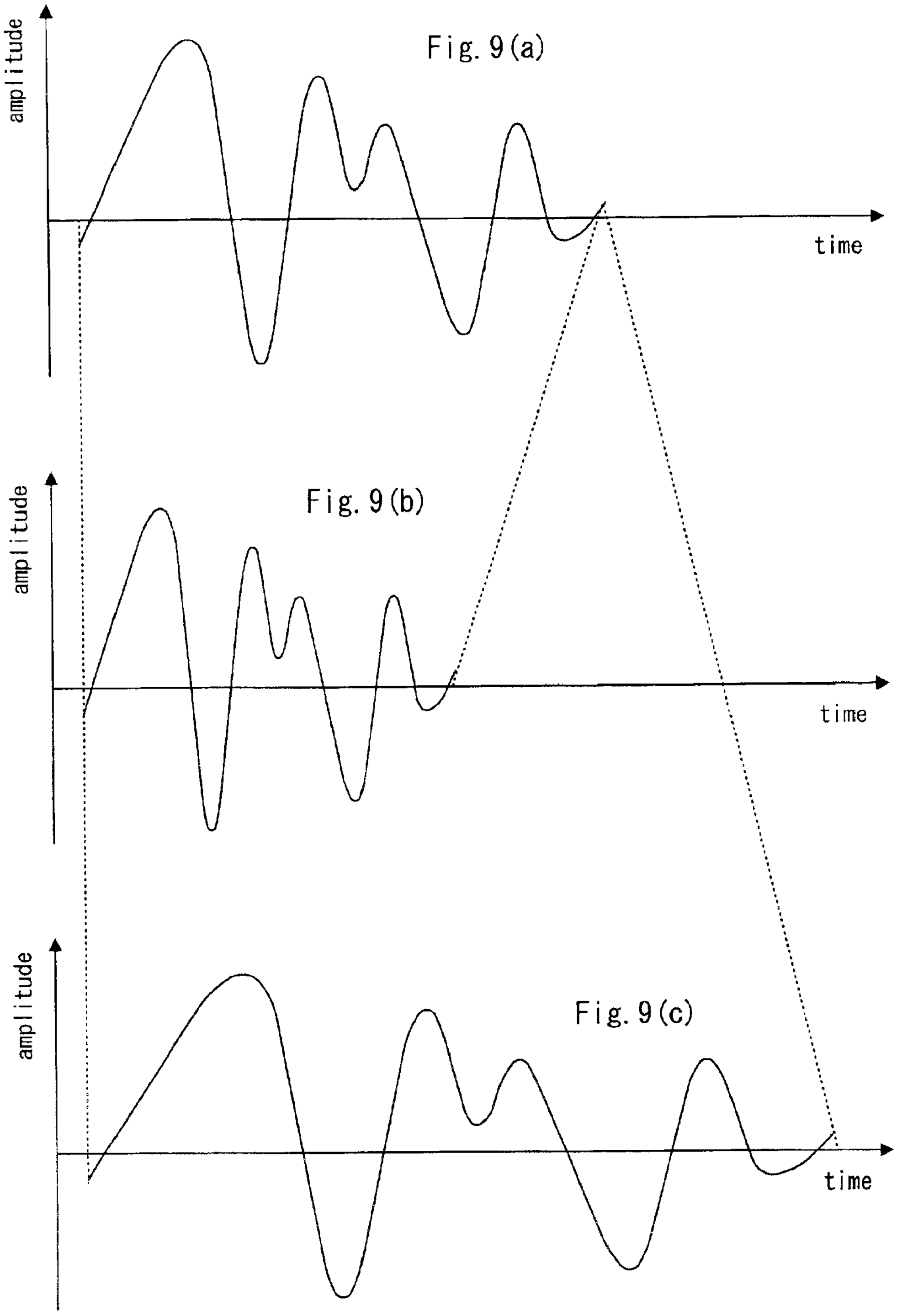

METHOD AND APPARATUS FOR SHIFTING PITCH OF ACOUSTIC SIGNALS

BACKGROUND OF THE INVENTION

1. Field of the Invention

The present invention relates to a method for shifting a pitch of acoustic signals, which are expressed in terms of a series of digital signals, to another optional pitch using a compaction and/or expansion process of the time axis and a cross-fade process, and an apparatus for performing the shift.

2. Description of the Related Art

Acoustic pitch shifting has been employed in, for example, KARAOKE, etc. The acoustic pitch shifting apparatus shifts an acoustic pitch to an easy-to-sing pitch without changing the speed of a melody.

That is, a pitch shifting apparatus is equipment, like a key controller used in KARAOKE, which shifts the pitch of acoustic signals, that is, the frequency thereof, to a multiple of the original frequency by a constant.

Until now, various types of pitch shifting methods have been proposed. However, the present invention relates to a technology for pitch-shifting a series of digital signals by a compaction and/or expansion process and a cross-fade process in terms of a time axis.

Herein, the compaction and/or expansion of the time axis is a process that compacts and/or expands the time axis of an original signal to generate a series of signals, which are multiples of the original frequency related by a constant.

Further, the cross-fade process overlaps faded-in signals which are partial signals picked up from the original signals and faded-out signals that are partial signals differing from the above-described partial signals in terms of a time axis.

(Prior Art 1: Pitch Shifting Technology without Compensating for a Phase Difference)

First, a description is given of the principle of pitch shift with reference to FIG. 9.

Compaction and/or expansion of the time axis In FIG. 9, the abscissa shows time while the ordinate shows amplitude of signals.

FIG. 9(*a*) shows the waveform of the original signals.

Herein, through compaction and/or expansion of the time axis, it is possible to shift the pitch (frequency).

For example, if the original signals shown in FIG. 9(*a*) are compacted in terms of a time axis, the original signals are shifted to higher frequencies as shown in FIG. 9(*b*).

The time required for reproduction of signals (FIG. 9(*b*)) after the compaction and/or expansion of the time axis is shorter than the time required for reproduction of the original signals (FIG. 9(*a*)).

On the other hand, if the original signals shown in FIG. 9(*a*) are expanded in terms of a time axis, the original signals are shifted to lower frequencies as shown in FIG. 9(*c*).

The time required for reproduction of signals (FIG. 9(*c*)) after the expansion of the time axis is longer than the time for reproduction of the original signals (FIG. 9(*a*)).

As described above, if compaction and/or expansion of the time axis is carried out, the time required for reproduction differs from the time required for reproduction of the original signals. This causes the problem that processes of changeover of time windows are made non-continuous thereby causing noise to occur.

Therefore, in the prior art technology 1, it was devised that a cross-fade process is added to the compaction and/or expansion of the time axis so that the time of reproduction remains the same as the original signal.

Combinations of the Compaction and/or Expansion of the Time Axis and the Cross-Fade Process FIG. 10(*a*) shows an example of compacting the time axis. FIG. 10(*b*) shows an example of expanding the time axis.

In FIG. 10(*a*), the upper section (1) thereof shows original signals expressed as a series of digital signals. The middle section (2) of FIG. 10(*a*) shows a compacting process of the time axis. The lower sections (3-1) and (3-2) show first and second examples of the cross-fade process, wherein the slashes (diagonal lines) in the lower sections (3-1) and (3-2) show the cross-faded points. In the first example, the cross-fade is made slightly longer, and in the second example, the cross-fade is made slightly shorter.

Components that are located below the diagonal lines are faded-in, and those that are located above the diagonal lines are faded-out.

A further detailed description is given of the respective processes with reference to FIG. 10(*a*).

Herein, a process is carried out with partial signals corresponding to a time (T1+T1) from the original signals. The time (T1+T1) is very short such as, for example, 0.1 seconds.

Also, it is assumed that the ratio K1 of the compaction of the time axis is a figure that is greater than 1, and **T2=K1*T1** is established.

Partial signals corresponding to the time (T2+T2) are picked up from the original time. The front half A1 of these signals is assigned to the fade-in side, and the rear half B2 thereof is assigned to the fade-out side.

The components A1 and B2 are subjected to the compaction in the time axis using the compression ratio K1, so that, after compaction, the front half component A1H and the rear half component B2H are obtained.

As a matter of course, the time of reproduction of these components A1H and B2H is time T1 in either of them.

Subsequently, partial signals corresponding to the time (T2+T2) are picked up so as to coincide with the top of the after-compaction rear half component B2H. The front half component, A2, is assigned to the fade-in side. The rear half component, B3, is assigned to the fade-out side.

The components A2 and B3 are subjected to compaction in the time axis using the compression ratio K1, wherein, after compaction, the front half component A2H and the rear half component B3H are obtained. The time for reproduction of components A2H and B3H is time T1 for each.

As in the above description, the after-compaction front half component A3H and the after-compaction rear half component B4H are obtained.

With respect to the after-compaction respective components thus obtained, B2H and A2H, B3H and A3H, and BnH and AnH (n: an integer) are subjected to the cross-fade process.

Also, as described above, BnH is faded-out while AnH is faded-in.

Herein, as in the first example (3-1), the cross-fade process may be carried out using all the sections of blocks, and, as in the second example (3-2), the cross-fade process may be carried out using only the part of the blocks in the vicinity of the center.

As shown in FIG. 10(*b*), where the pitch is lowered, the compaction of the time axis is changed to the expansion of the time axis wherein the process is identical to the case (FIG. 10(*a*)) of raising the pitch, except that the compaction ratio is smaller than 1.

Through the cross-fade process, noise is prevented from occurring due to non-continuation of the changing points of the time windows. In addition, the reproduction of the output signals whose pitch is shifted, occupies the same time as does reproduction of the original signals.

Referring to FIG. 8, acoustic signals, expressed as a sequence of digital signals, entering through an acoustic input terminal 807, are stored temporarily in a memory 801. Addresses for the memory 801 are produced by a reading address generating means 804. Reading address generating means produces two series (fade-in side and fade-out side) of signals which are fed to filter calculating means 802_a_ and 802_b_ on the basis of the designated addresses. The filter calculating means 802_a_ and 802_b_ compact and/or expand the read series of signals in terms of time axes in order to shift the pitch (frequency) thereof.

A cross-fade means 803 cross-fades two series of signals, which have been compacted and/or expanded in terms of the time axes. The result of cross-fading is output through an acoustic output terminal 808.

The problem in prior art 1 resides in that, in the cross-fade process, a sense of tremolo results from phase differences between the series of signals at the fade-in side and the series of signals at the fade-out side. If the phases in the two constant-amplitude series of signals happen to be coincident with each other by chance as shown in FIG. 11, since there is no change in the envelope curve (that is, a line connecting the peaks of amplitudes) of the amplitudes of output signals in the cross-fade process, no sense of tremolo occurs. However, generally, the phases of the two series of signals are not coincident with each other.

In particular, as shown in FIG. 12, if the two constant-amplitude series of signals are completely inverted, these series of signals are subjected to a relationship, in which these signals cancel each other, in the cross-fade sections. As a result, the amplitude of the output signals is smaller than the amplitude in the sections where no cross-fade process is carried out. Therefore, the amplitudes are different from each other in the sections in which no cross-fade process is carried out and the sections in which a cross-fade process is carried out. This reinforcement and cancellation is repeated over time, whereby the output signal carries a sense of tremolo that is absent from the input signals.

(Prior Art 2: Pitch Shifting Technology for Compensating for a Phase Difference)

Japanese Unexamined Patent Application No. Hei-5-297891 discloses one method for accomplishing prior art 2 that improves the problem.

In this application publication, the sense of tremolo results from the phase difference between two series of signals that are subjected to the cross-fade process. Therefore, the phase difference is obtained with respect to the two series of signals. One of the two series is shifted in the direction of the time axis equivalent to the phase difference. This matches the signal phases to eliminate or reduce the false tremolo.

In detail, the peaks of the two series of signals are obtained, and the series of signals are time shifted an amount equivalent to the difference between the peaks.

Although a detailed reason is described later, the conclusion is that this process is satisfactory to simplify voice signals for the time being, in the case of complicated acoustic signals such as music (that is, particularly those including many intensive harmonic overtone components), erroneous detection of the peaks frequently occurs. As a result, the phase matching is unsatisfactory.

OBJECTS AND SUMMARY OF THE INVENTION

The problems of the above-described prior arts 1 and 2 are summarized as follows;

Prior Art 1:

A sense of tremolo occurs in the method for shifting a pitch without compensating for a phase difference Prior Art 2:

In the method for compensating for a phase difference using the peaks of signals, the effect of reducing the sense of tremolo is made complicated by erroneous detection of the peaks of complicated signals.

Therefore, a first object of the present invention is to provide a technology that is able to prevent a sense of tremolo from occurring even with respect to complicated signals.

In addition, in line with employment of the compaction technique, there are many cases where recent audio signals are processed block by block, wherein one block is composed of data of, for example, 64, 80 or 192 samples. When processing audio signals block by block, generally, the process in blocks is easy. Complication occurs when processing a plurality of blocks. As a result, the processing is complicated thereby increasing the amount of calculation.

For example, using a frequency of 48 kHz on audio signals of 100 Hz, one audio cycle is represented by 480 samples. In order to detect phase differences between two 100-Hz signals, the necessary range of retrieval is 480. The process is further complicated by the necessity to cover a plurality of blocks, thereby increasing even further the amount of calculation, and the amount of memory required to store the series of signals from the plurality of blocks.

Therefore, a second object of the invention is to provide a pitch shifting technology that reduces the amount of calculation and amount of memory even in the block-by-block process.

In order to achieve the first object, a method for shifting a pitch according to the first aspect of the invention comprises the steps of: storing acoustic signals, which are expressed by a series of digital signals, in a memory; reading a series of signals at the fade-in side and a series of signals at the fade-out side from the memory and compacting and/or expanding the same in terms of a time axis; and cross-fading the series of signals at the fade-in side and series of signals at the fade-out side, which have been compacted and/or expanded in terms of a time axis; wherein phase differences between the series of signals at the fade-in side and those at the fade-out side are compensated on the basis of fundamental tones.

With the above-described construction, since phase differences of two series of signals at the fade-in side and fade-out side are compensated, the sense of tremolo is suppressed. Further, since the phase differences are compensated on the basis of the fundamental tones, erroneous detection of the phase difference is remarkably reduced. Thus, the sense of tremolo is suppressed even for complicated audio signals such as music, etc.

In order to achieve the second object, an apparatus for shifting a pitch according to the second aspect of the invention comprises means for adjusting phase differences, which detect the phase differences and compensates for the same, with respect to two series of signals at the fade-in side and the fade-out side, whose time axes corresponding to inputs of cross-fading means deviate, and adjusting the phase differences, wherein the means for adjusting the phase differences includes an adjusting feature consisting of a plurality of stages, wherein in the first stage of adjusting the phase differences, the two series of signals are divided into defined blocks, the representative values are obtained block by block, a deviation between the blocks, at which the block-by-block phase difference is minimized in the two series of signals, is obtained by using the representative values, the series of signals at the fade-in side of the two series of signals are shifted equivalent to the obtained amount of the deviation, and after the first stage of adjusting the phase difference, in the second and subsequent stages of adjusting the phase differences, a further detailed phase difference than those in units of blocks is obtained sample by sample or several samples by several samples with respect two series of signals, the series of signals at the fade-in side of the two series of signals is shifted equivalent to the obtained phase difference, the cross-fading means carries out a cross-fading process after the means for adjusting phase differences completes the adjustment of the phase differences. With the construction, the amount of calculation and amount of memory are minimized even in the block-by-block processing mode.

BRIEF DESCRIPTION OF THE DRAWINGS

FIG. 1(*b*) is a flow chart of means for adjusting phase differences according to the first embodiment of the invention.

FIG. 2(*b*) is a view to which reference will be made in explaining the primary adjustment of phase differences by the means for adjusting phase differences according to the first embodiment of the invention.

FIG. 2(*c*) is a view to which reference will be made in explaining the least-squares method with respect to the primary adjustment of phase differences by the means for adjusting a phase difference according to the first embodiment of the invention.

FIG. 2(*d*) is a view to which reference will be made in explaining a range of adjusting the phase differences.

FIG. 3(*b*) is a view to which reference will be made in explaining the primary adjustment of phase differences by the means for adjusting phase differences according to the first embodiment of the invention.

FIG. 3(*c*) is a view to which reference will be made in explaining the least-squares difference of the primary adjustment of phase differences by the means for adjusting a phase difference according to the first embodiment of the invention.

FIG. 3(*d*) is a view to which reference will be made in explaining a range of adjusting the phase differences.

FIG. 9(*a*) is a view to which reference will be made in explaining the principle of shifting a pitch (original signals).

FIG. 9(*b*) is a view to which reference will be made in explaining the principle of shifting a pitch (signals compacted in terms of its time axis).

FIG. 9(*c*) is a view to which reference will be made in explaining the principle of shifting a pitch (signals expanded in terms of its time axis).

FIG. 10(*b*) is a view to which reference will be made in explaining a cross-fade process (expanding in terms of a time axis).

DETAILED DESCRIPTION OF THE PREFERRED EMBODIMENTS (Embodiment 1)

An apparatus for shifting a pitch according to the first embodiment of the invention includes means for adjusting a phase difference, wherein the phase difference adjusting means adjusts the phase difference in two stages.

Figure 1A:
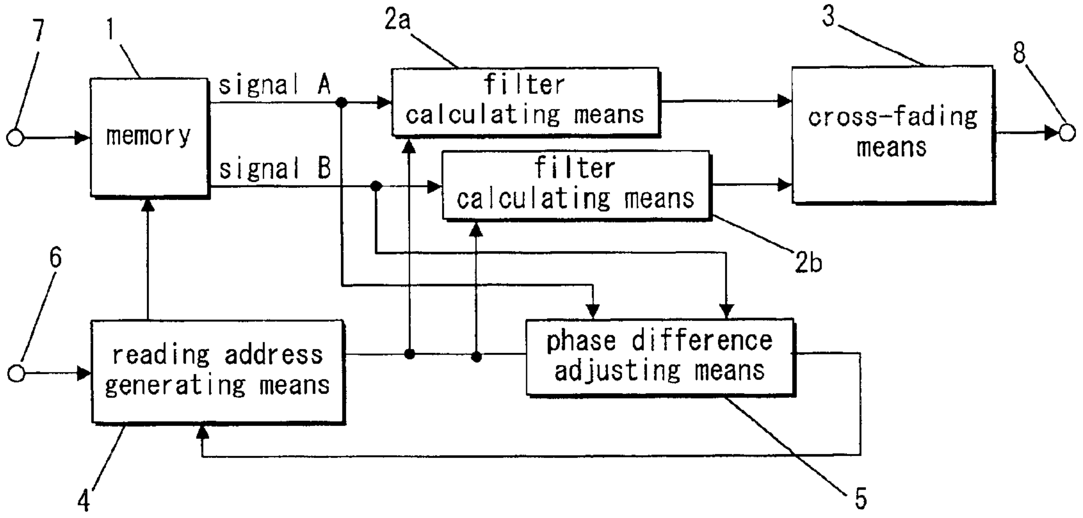
FIG. 1(*a*) is a block diagram of an apparatus for shifting a pitch according to a first embodiment of the invention.
Figure 1B:
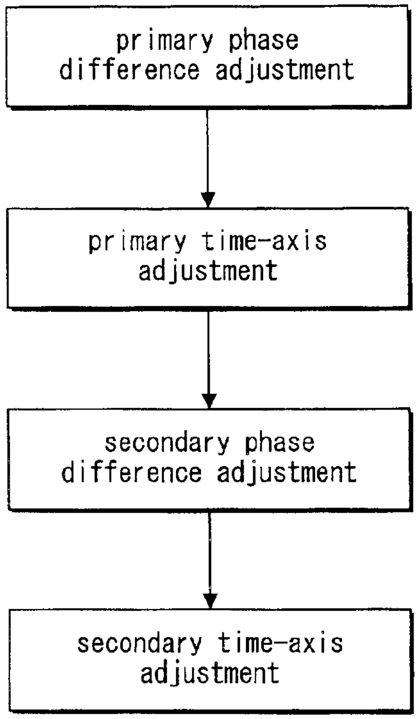
Figure 2A:
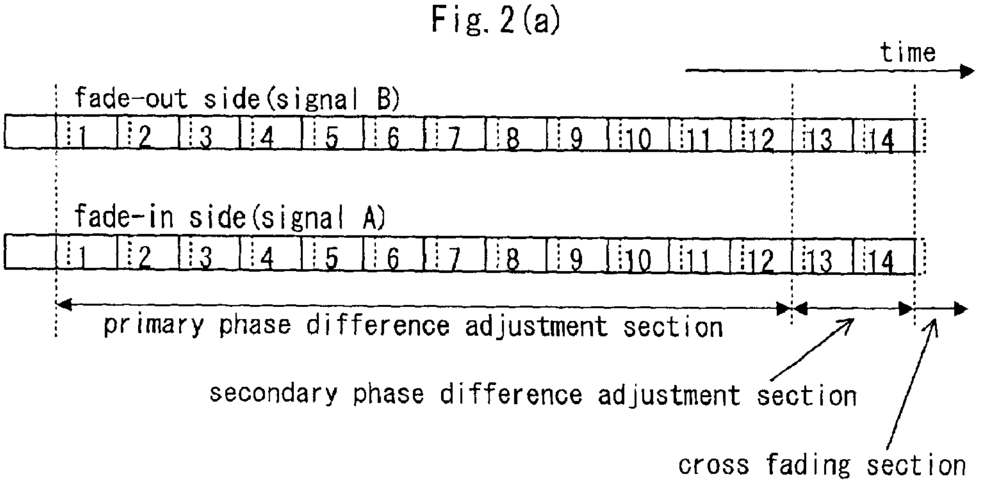
FIG. 2(*a*) is a view to which reference will be made in explaining a range of adjusting the phase differences according to the first embodiment of the invention.
Figure 2B:
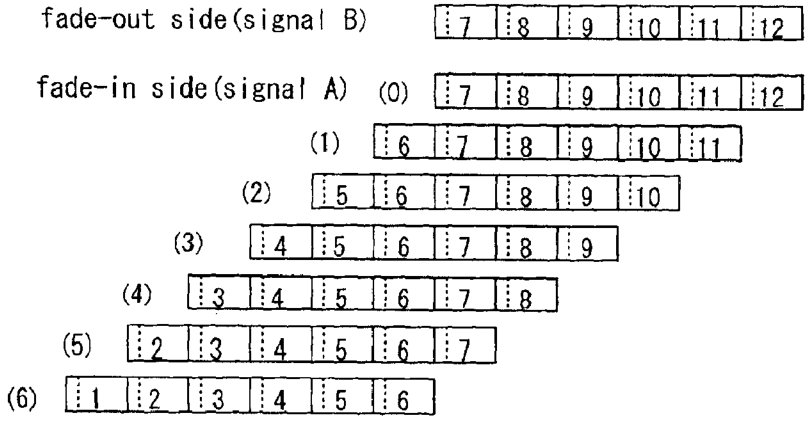
Figure 2C:
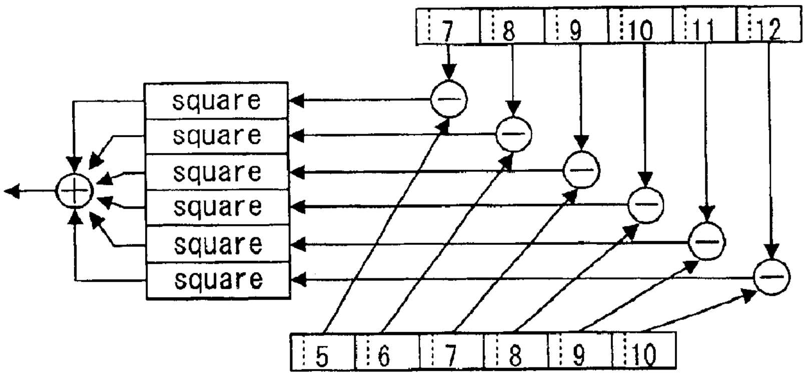
Figure 2D:
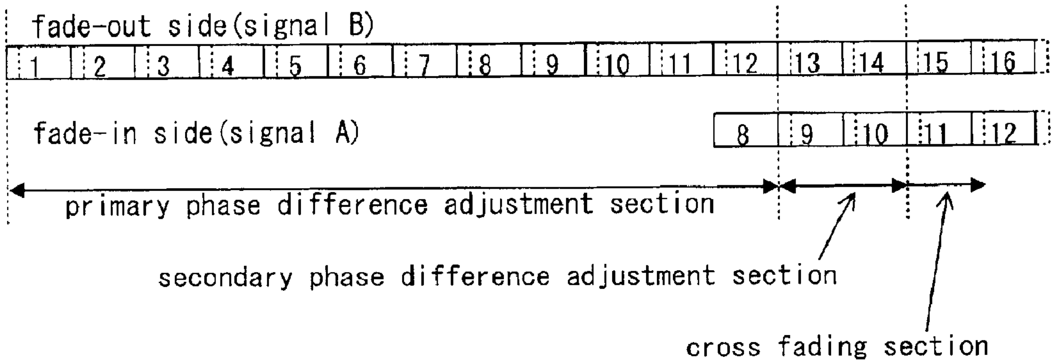
Figure 3A:
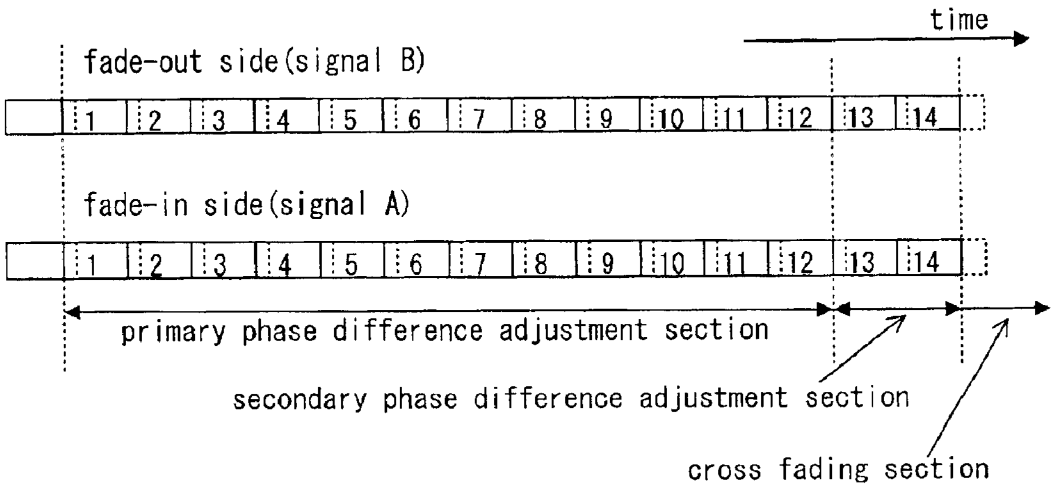
FIG. 3(*a*) is a view to which reference will be made in explaining a range of adjusting the phase differences.
Figure 3B:
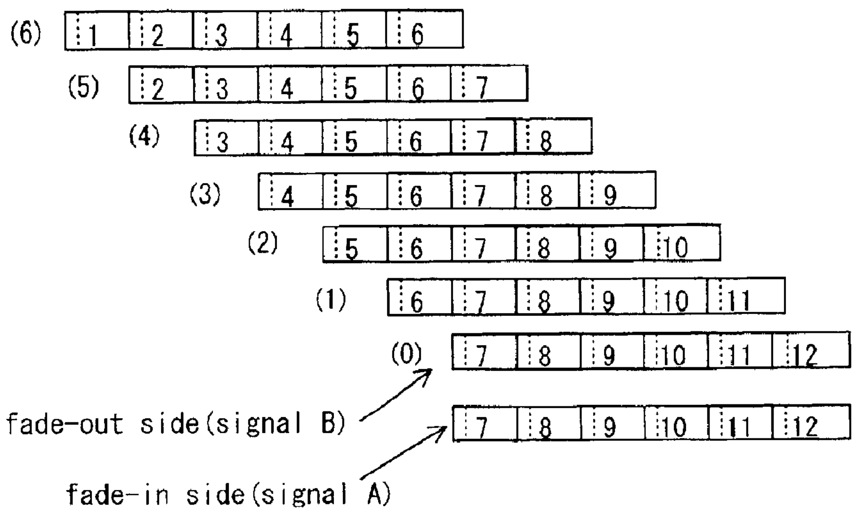
Figure 3C:
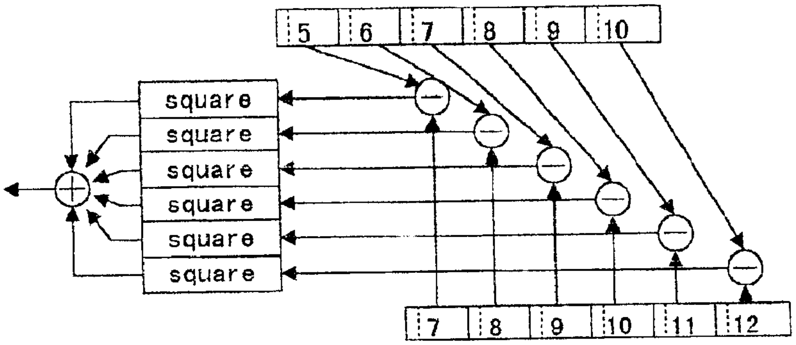
Figure 3D:
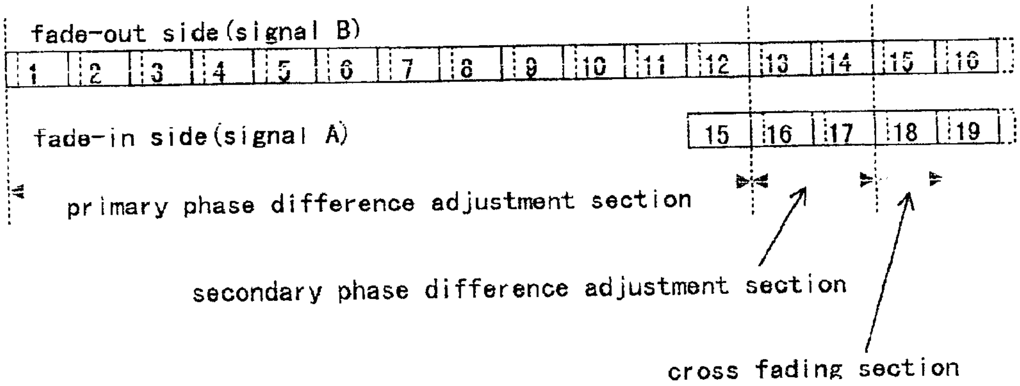

Referring to FIG. 1(*a*), an apparatus for shifting a pitch, according to the invention, includes a memory 1, filter calculating means 2*a* and 2*b*, a cross-fading means 3, a reading address generating means 4, a phase difference adjusting means 5, a pitch control signal inputting terminal 6, an acoustic signal inputting terminal 7, and an acoustic signal outputting terminal 8.

The memory 1 provisionally stores sampled digital acoustic signals from the acoustic signal inputting terminal 7. The reading address generating means 4 generates reading addresses of signals, which are read from the memory 1, in response to the signals from the pitch control signal inputting terminal 6. The filter calculating means 2*a* and 2*b* filter signals from the memory 1, generate signals whose time axis is compacted and/or expanded, and output the resulting signals to the cross-fading means 3.

Pitch shifting signals are cross-faded by the cross-fading means 3. The resulting audio signal is outputted from the acoustic outputting terminal 8.

The phase difference adjusting means 5 obtains phase differences of the two series of signals from the memory 1, and sends the values to the address generating means 4. Phase-control signals from the phase difference adjusting means 5 are fed back to the reading address generating means which responds by adjusting the addresses of the two signals being read out from the filter calculating means 2*a* and 2*b*. That is, one or both of the sequences of addresses are advanced or retarded in order to phase-shift the signals being read out of the filter calculating means 2*a* and 2*b*.

Prior to the cross-fade process, the multiplication coefficient of the series of signals at the fade-in side is zero while that at the fade-out side is 1. Therefore, only the components of the series of signals at the fade-out side appear in the acoustic output. Also, at this time, since the multiplication coefficient at the fade-in side is zero, no adverse influence is brought about on the acoustic output even when the series of signals at the fade-in side is shifted.

Referring now to FIG. 1(*b*), a two-stage construction is employed in the phase difference adjusting means 5. The primary phase difference adjustment, a rough compensation, is performed in compliance with the primary phase difference detection and time-axis adjustment and the secondary phase difference adjustment, a fine compensation, in compliance with the secondary phase difference detection and time-axis adjustment are handled. The phase difference adjustments, both rough and fine compensations, are carried out prior to the cross-fade process.

First, two series of signals are divided into blocks (there may be a case where signals are divided from the beginning in accordance with the audio format). For example, one block may be composed of thirty-two samples.

As shown in FIG. 2(*a*), a case is shown where fourteen blocks before commencing the cross-fade process are used for phase difference adjustment.

And it is assumed that the first twelve of the fourteen blocks are used for primary phase difference adjustment. The last two samples are used for secondary phase difference adjustment. The secondary phase difference adjustment is for micro-adjustment of the phase. Therefore, the secondary phase difference adjustment does not require allotment of a large number of blocks. That is, for example, one, tow or three blocks may be sufficient.

First, a description is given of the primary phase difference adjustment, a rough compensation.

Representative values are obtained block by block.

Figure 4:
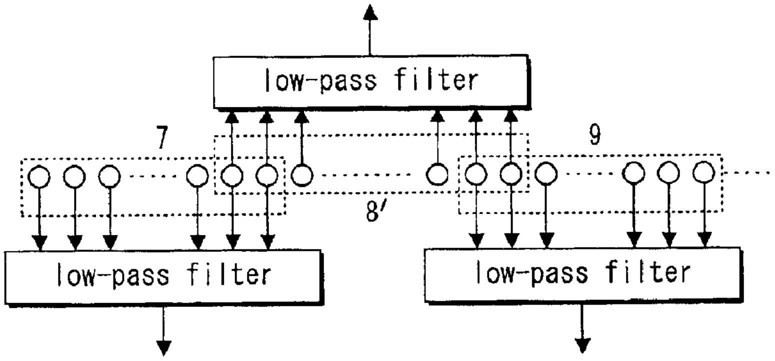
FIG. 4 is a view to which reference will be made in explaining the representative values of a block according to the first embodiment of the invention.

As shown in FIG. 4, the representative values are obtained by passing the series of signals through low-pass filters.

In FIG. 4, a single circle indicates a single sample. A dashed-line rectangle, 7, 8', 9, that surround pluralities of samples each indicates a single block. FIG. 4 shows an example in which a part of the blocks adjacent to each other overlap. Overlap is not a necessity since the present invention is also applicable to an example in which blocks do not overlap.

Herein, a case where a pitch is raised is taken into consideration.

As shown in FIG. 2(*b*), block rows in which the phase difference is minimized are obtained with respect to seven types of: (0) 7 through 12, (1) 6 through 11, (2) 5 through 10, (3) 4 through 9, (4) 3 through 8, (5) 2 through 7, and (6) 1 through 6 of the blocks of the series of signals at the fade-in side on the basis of blocks 7 through 12 of the series of signals at the fade-out side. The seven types are such that the block rows are established as differences.

As shown in FIG. 2(*c*), the example of the method for obtaining uses the method of minimizing the least-squares difference of the corresponding blocks. Respective differentials between the top block and respective blocks are obtained and the square-sum is obtained. The deviation of the block in which the square-sum is minimized is used to define the amount of shift in the first phase difference adjustment.

In the above-described example, if the square-sum of the block row (4) 3 through 8 is the least, as shown in FIG. 2(*d*), the series of signals at the fade-in side corresponding to the fade-out sides 13 and 14 are 9 and 10 which have been shifted by four blocks from their former time position. When lowering the pitch, the block rows which are made into the reference are the series of signals at the fade-in side.

As shown in FIG. 3(*b*), as in the case where pitches are raised, block rows in which the phase difference is minimized are obtained with respect to seven types of: (0) 7 through 12, (1) 6 through 11, (2) 5 through 10, (3) 4 through 9, (4) 3 through 8, (5) 2 through 7, and (6) 1 through 6 of the blocks of the series of signals at the fade-in side on the basis of blocks 7 through 12 of the series of signals at the fade-in side as in the case of raising the pitch.

In the above-described example, if the phase difference is minimum in the block row (3) 4 through 9, the series of signals at the fade-in side, corresponding to the blocks 13 and 14 at the fade-out side, become 16 and 17, which are shifted by three blocks from their future side.

Next, a description is given of the secondary phase difference adjustment, a fine compensation.

Figure 5:
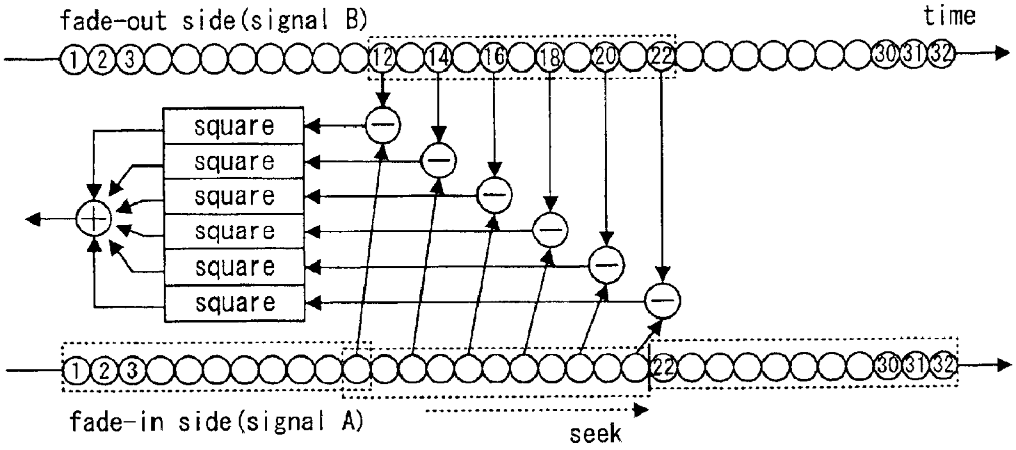
FIG. 5 is a view to which reference will be made in explaining the least-squares difference of the secondary adjustment of phase differences by the means for adjusting a phase difference according to the first embodiment of the invention.

As shown in FIG. 5, the reference is placed at the fade-out side.

For example, the reference is placed on the twelfth, fourteenth, sixteenth, eighteenth and twentieth sample among the thirty-two samples.

To the contrary, at the fade-in side, rows in which the least-squares difference is minimized as in the primary phase difference adjustment are obtained with respect to the first, third, fifth, seventh, ninth and eleventh samples to the twenty-second, twenty-fourth, twenty-sixth, twenty-eighth, thirtieth, and thirty-third samples. Although all samples are not processed, some samples are thinned in a reasonable range in order to decrease the amount of processing.

For example, with respect to the seventh, ninth, eleventh, thirteenth, and seventeenth samples that are shifted by five samples, the series of signals at the fade-in side are shifted by five samples from their former side. The secondary phase difference adjustment may be carried out several times. In this example, the secondary phase difference adjustment is carried out twice. That is, the adjustment is performed when the blocks at the fade-out side are the thirteenth sample and the fourteenth sample.

The secondary phase difference adjustment may be performed using the fade-in side as reference. There is no change in the side to be shifted using the phase difference from the fade-in side. This is because, before commencing the cross-fade process, the multiplication coefficient of the series of signals at the fade-in side is zero.

Next, a description is given of effects of the above-described preferred embodiment.

Since the phase difference adjusting means is composed of the primary stage and the secondary stage (that is, a plurality of stages), the amount of calculations and the amount of memory are reduced.

Use of block-by-block representative values in the primary stage permits using only seven types of least-squares differences in the above-described example.

Further, it is sufficient to store in memory only a single representative value per block.

If an attempt is made to cover a full range of the primary phase difference adjustments using only the secondary phase difference adjusting means, the amount of calculations is increased by approximately one digit.

In addition, in that case, since it is necessary to store all the corresponding series of signals in a memory, the capacity of the memory must be increased.

Thus, a remarkable effect is brought about which decreases the amount of calculations and the amount of memory by composing the means for adjusting phase differences by two stages.

Values, which are obtained by multiplying the series of signals in blocks by a low-pass filter, are employed as the representative values of the blocks.

Generally, musical acoustic signals contain combinations of a fundamental tone of the lowest frequency and a harmonic overtone, which is an integral number of times the frequency of the fundamental tone. If the phases are made coincident with the fundamental tone, the phases will be made coincident with each other at the harmonic overtone. On the contrary, it is not necessarily correct that the phases of the fundamental tones are coincident if the phases of the harmonic overtones are coincident with each other.

Figure 6:
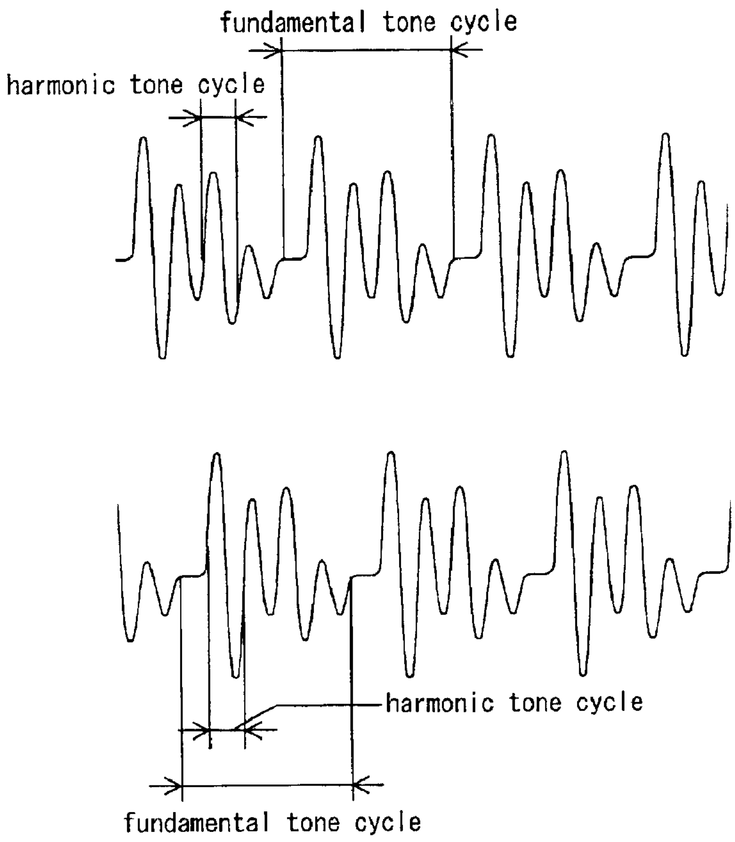
Fig. 6 Prior Art
FIG. 6 is a view to which reference will be made in explaining erroneous detection in prior art 2.

Referring to FIG. 6, although the phases are made coincident with each other for harmonic overtones having a large amplitude, the phases of the fundamental tones are different. Also, if the phases are matched using the peaks of amplitudes as in prior art 2, there is a high possibility that the phase differences are incorrectly detected.

That is, in prior art 2, since the phase differences are obtained, not from the fundamental tones but from the harmonic overtones, the type of erroneous phase detection illustrated in FIG. 6 is the largest cause of phase detection error.

On the other hand, as in the present embodiment, if the output of a low-pass filter is used for obtaining the representative values of blocks, the level of harmonic overtones that could cause erroneous detection of the phase differences is reduced, and the fundamental tones are picked up. Therefore, the chance of erroneous detection of phase differences is largely reduced.

In addition, there is no problem if the fundamental tone has a higher frequency than the cut-off frequency of the low-pass filter. Therefore, there is no problem even when a block of any phase difference is selected in the primary phase difference adjustment. Since the frequency of the fundamental tone is high, a portion of one cycle of the fundamental tone enters one block. If the phase of this portion of the fundamental tone is used as a reference for phase adjustment, then the secondary phase adjustment is all that is needed to adjust the phase of the fundamental tone.

Where the pitch is raised in the primary phase difference adjustment, the series of signals at the fade-out side are used as the reference. The phase difference between the reference and the time-slipped series of signals at the fade-in side is obtained, wherein the acoustic signals are shifted from their former time positions.

Where the pitch is lowered, the series of signals at the fade-in side are used as the reference. The phase difference between the reference and the time-slipped series of signals at the fade-out side is obtained, wherein the acoustic signals are shifted from their future side.

These operations decrease the amount of memory 1 in FIG. 1 (*a*) because of the presence of the phase difference adjusting means 5.

Figure 7:
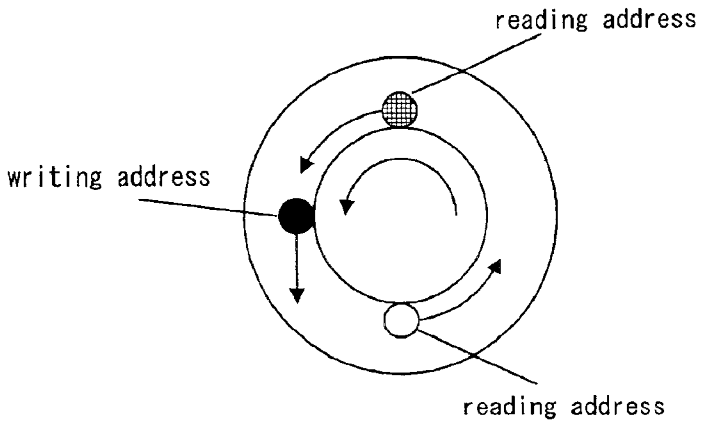
FIG. 7 is a view showing the relationship between a reading address and a writing address in the first embodiment of the invention.
Figure 8:
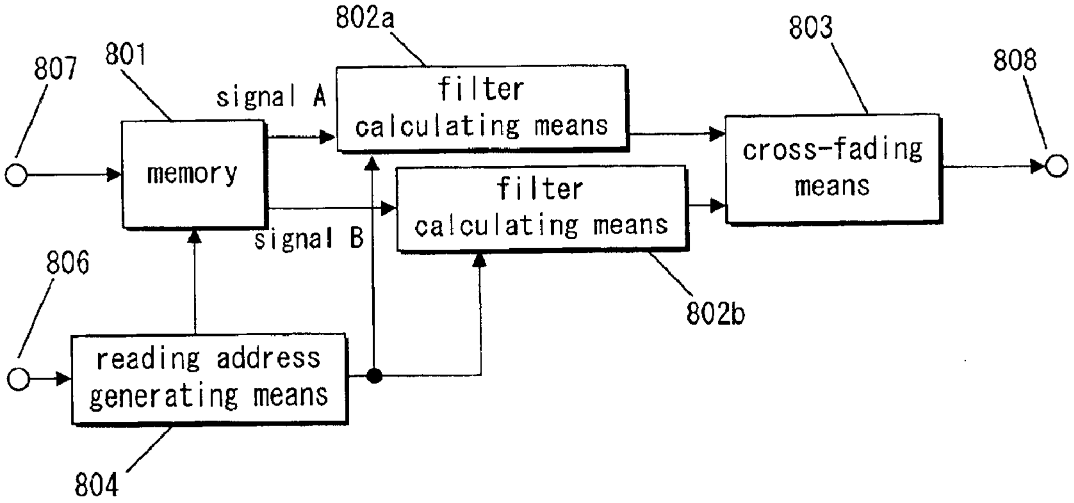
Fig. 8 Prior Art
FIG. 8 is a block diagram showing an apparatus for shifting a pitch according to prior art 1.
Figure 10A:
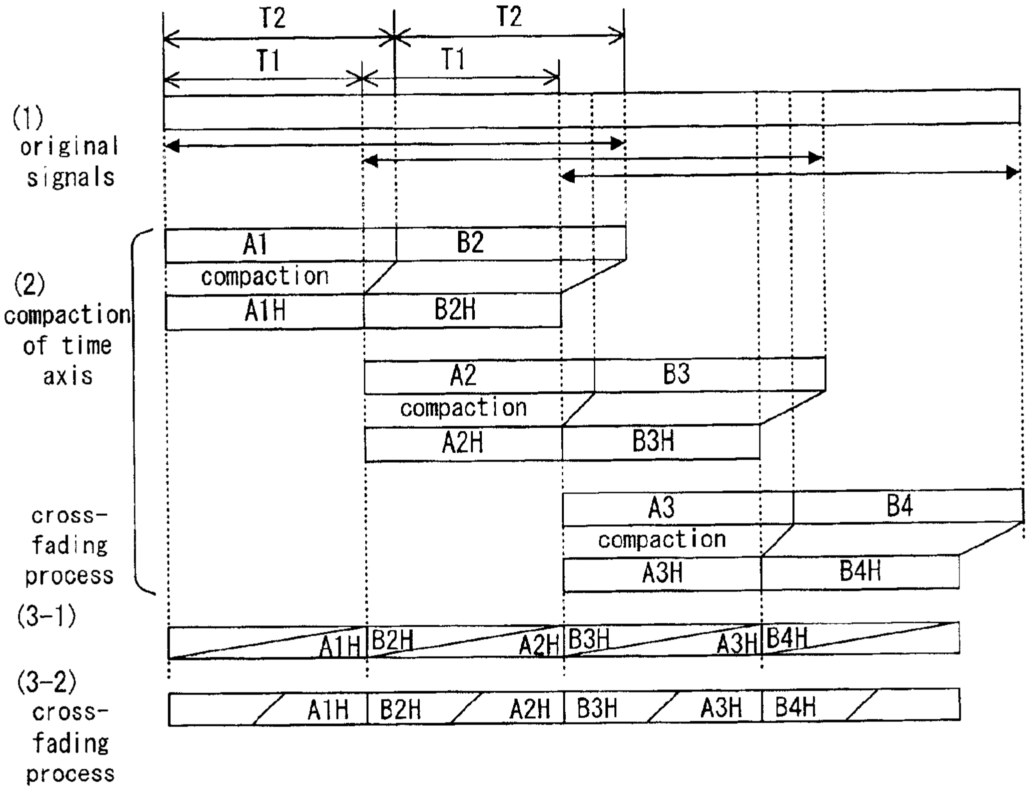
Fig. 10(a) Prior Art
FIG. 10(*a*) is a view to which reference will be made in explaining a cross-fade process (compacting in terms of a time axis).
Figure 10B:
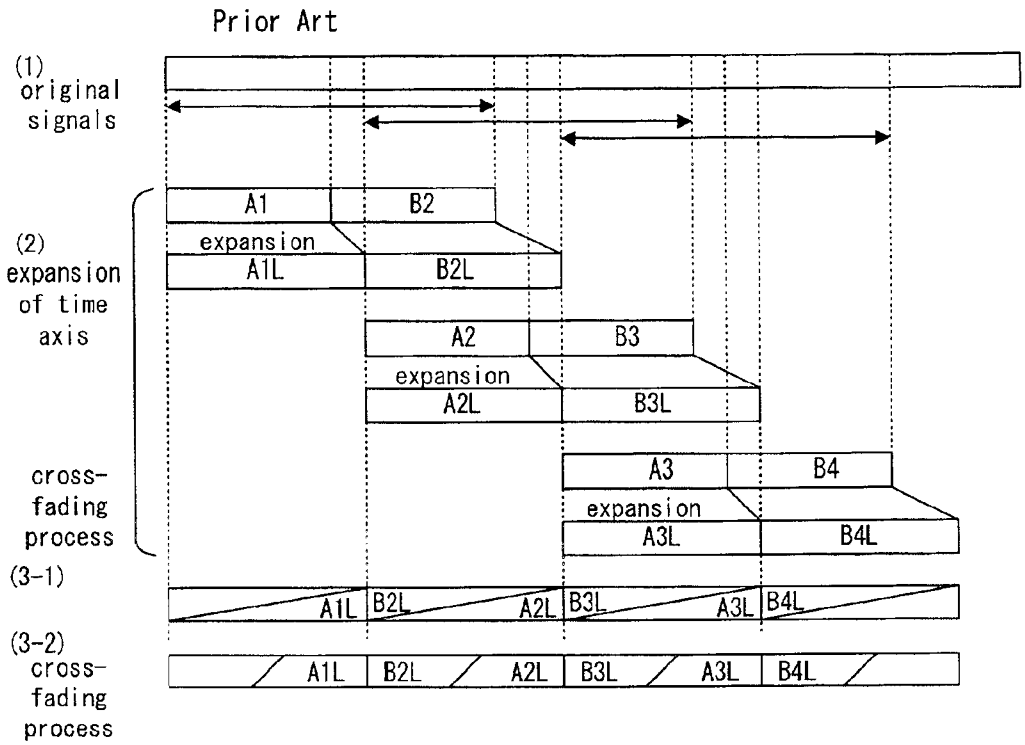
Figure 11:
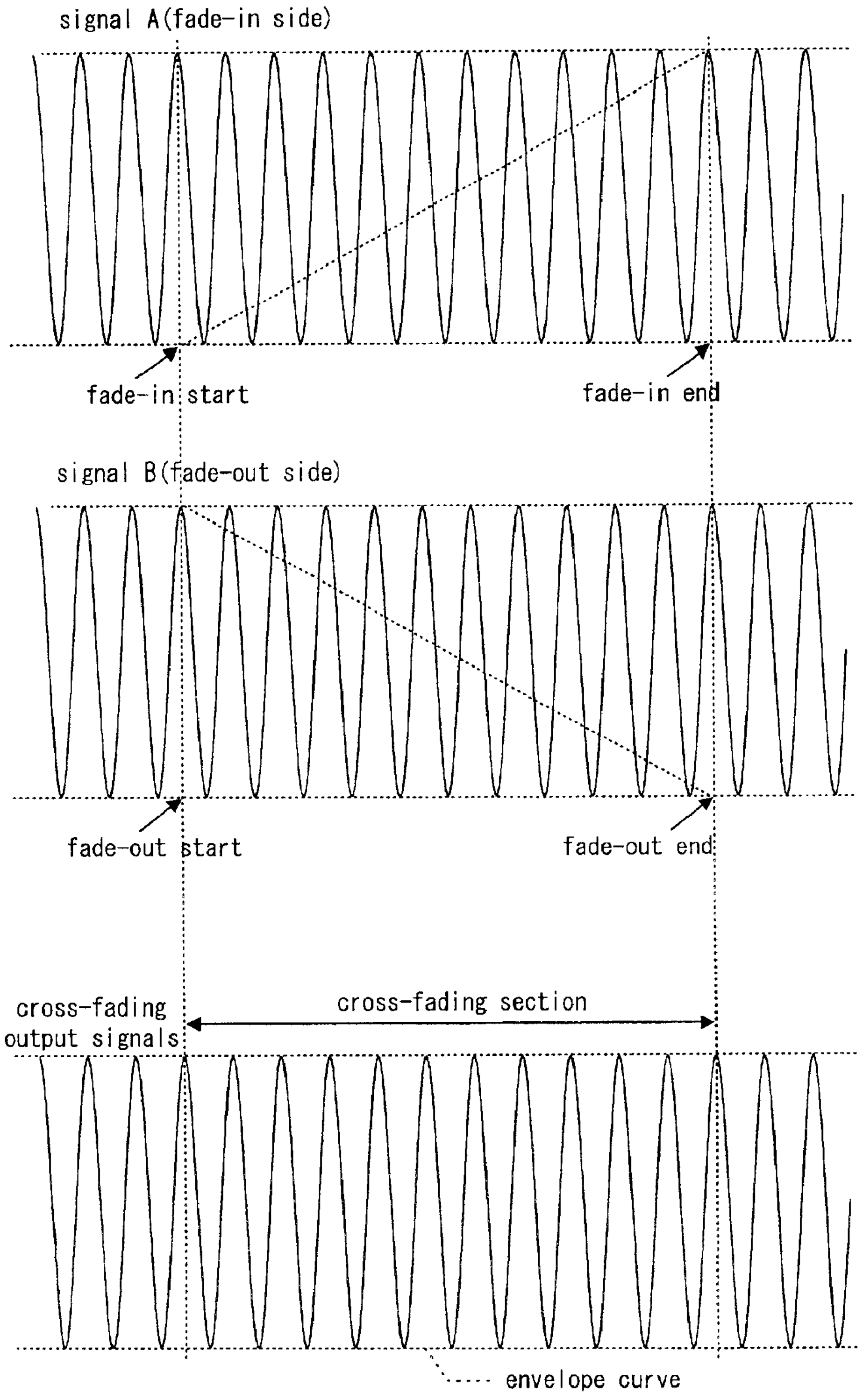
Fig. 11 Prior Art
FIG. 11 is a view showing the relationship between the cross-fade process and the sense of tremolo.
Figure 12:
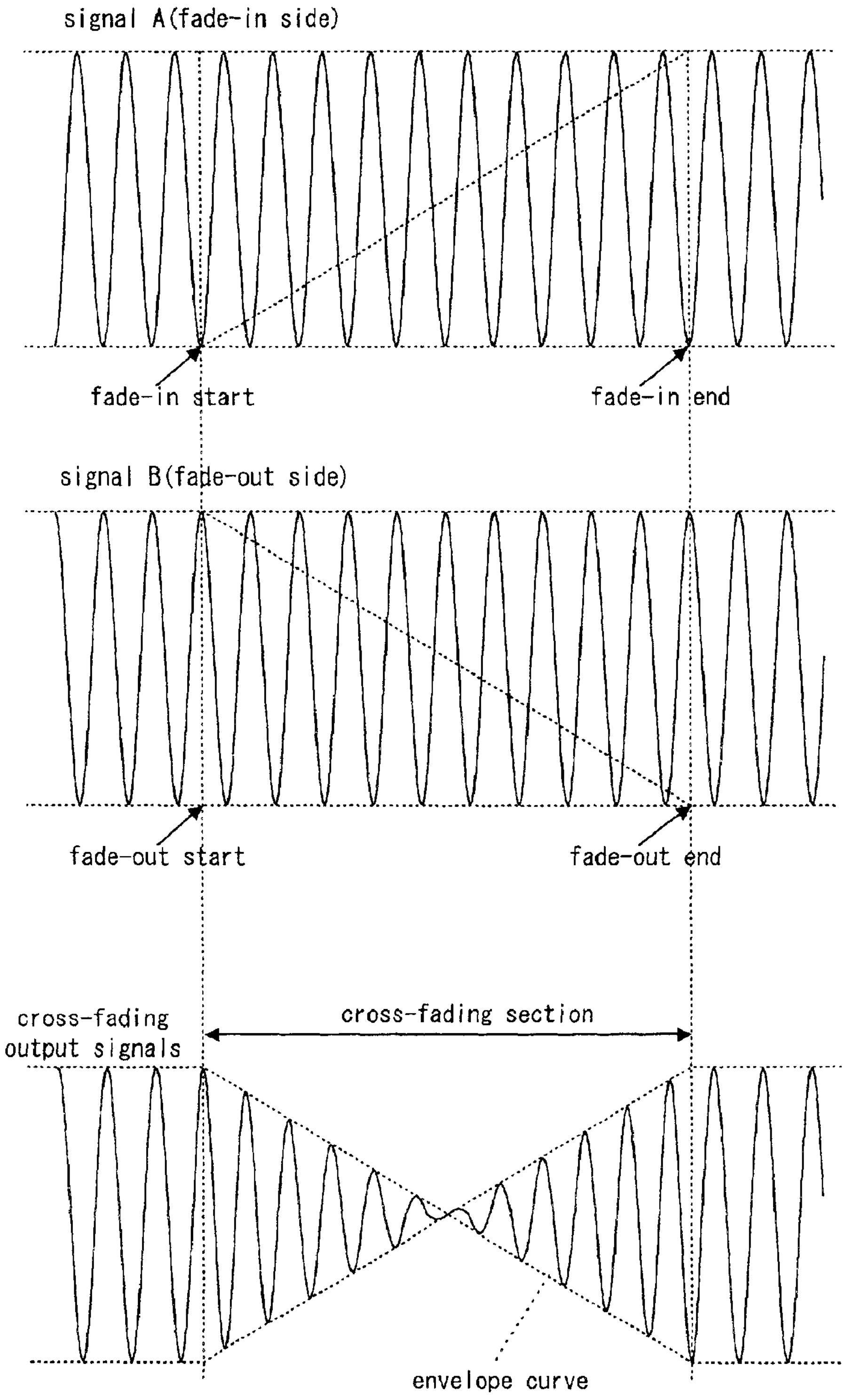
Fig. 12 Prior Art
FIG. 12 is a view showing the relationship between the cross-fade process and the sense of tremolo.

FIG. 7 shows the relationship between a writing address and a reading address in memory 1. When the pitch is raised, since the renewing rate of addresses read from memory 1 is fast, it is necessary that an address by which signals of the acoustic input terminal 7 are recorded is set to a figure having sufficient allowance so that the above-described reading address does not catch up with the address. When the pitch is raised, the series of signals at the fade-in side are used as the reference. As a result, the acoustic signals equivalent to the phase difference can be shifted from the future side. However, this requires the preparation of a memory equivalent to the maximum value (in this example, six blocks) that the amount of shift is taken further in order to permit shifting the acoustic signals from the future side in addition to the above-described sufficient allowance. This is the same where the pitch is lowered.

Since the renewing rate of a reading address from memory 1 is slow, it is necessary that the address at which signals of the acoustic inputting terminal 7 are recorded is set to a value having sufficient allowance so that the above-described reading address does not catch up with the address.

When the pitch is lowered, the series of signals at the fade-out side is used as the reference. As a result, it is possible to shift the acoustic signals equivalent to the phase difference from the past side.

Since, in the method according to the invention, the shift is made from the past side when raising the pitch and is made from the future side when lowering the pitch, it is unnecessary to newly increase the amount of memory in line with the primary phase difference adjustment.

According to the invention, since the phase difference adjustment is performed in a plurality of stages consisting of the primary, the secondary and subsequent stages, and the primary phase difference adjustment is carried out block by block, the amount of calculations and amount of memory are decreased.

Erroneous detection of the phase difference is reduced by using the output of the low-pass filter as the representative values of blocks by the primary phase difference adjusting means.

When raising the pitch by the primary phase difference adjustment, the series of signals at the fade-out side are used as the reference. The phase difference between the same reference and the time-slipped series of signals at the fade-in side is obtained, in order to shift the acoustic signals from their former side.

Where the pitch is lowered, the series of signals at the fade-in side are used as the reference. The phase difference between the same reference and the time-slipped series of signals at the fade-out side is obtained, in order to shift the acoustic signals from the future side.

The operation reduces the amount of memory required. That is, the present invention provides an apparatus for shifting a pitch, in which erroneous detection of phase differences is prevented. Block-by-block processing does not require large amounts of calculation and memory, and has almost no sense of tremolo.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method for shifting a pitch, comprising the steps of:

storing acoustic signals, which are expressed by a series of digital signals, in a memory;

reading a first series of signals at a fade-in side and a second series of signals at a fade-out side from said memory;

performing at least one of compacting and expanding a time axis of at least one of said first and second series of signals;

wherein the step of performing includes performing a primary phase difference adjustment, and performing a secondary phase adjustment having an adjustment level that is finer than the primary phase adjustment;

cross-fading said first and second series of signals after the step of performing to produce an output signal;

detecting and compensating for a phase difference between said first and second series of signals by adjusting blocks of said first and second series of signals to minimize said phase difference; and the step of detecting and compensating using fundamental tones in said first and second series of signals.

2. The method for shifting a pitch, as set forth in claim 1, wherein:

said primary phase difference adjustment includes carrying out said primary phase difference adjustment in units of blocks of said first and second series of signals; and said secondary phase adjustment includes carrying out said secondary phase adjustment in units of samples of blocks.

3. The method for shifting a pitch, as set forth in claim 1 wherein the step of using fundamental tones includes passing said first and second series of signals through a low-pass filter.

4. An apparatus for shifting a pitch comprising:

a memory for storing acoustic signals expressed as a series of digital signals;

means for reading from said memory a first series of signals at a fade-in side and a second series of signals at a fade-out side;

means for performing at least one of compacting and expanding a time axis of at least one of said first and second series of signals;

means for cross-fading said first and second series of signals after they are compacted or expanded;

said means for performing including adjusting means having a plurality of adjustment stages, wherein a first adjusting stage adjusts a phase difference between said first and second series of signals by adjusting blocks of said first and second series of signals to minimize said phase difference; and said means for performing further including means for employing only fundamental components of said first and second series of signals for said adjusting the blocks of said first and second series of signals;

said means for performing further including means for performing a primary phase difference adjustment, and means for performing a secondary phase adjustment having an adjustment level that is finer that the primary phase difference adjustment.

5. The apparatus for shifting a pitch, as set forth in claim 4, wherein:

said primary phase difference adjustment employs blocks of said first and second series of signals; and said secondary phase adjustment employs samples that constitute a block.

6. The apparatus for shifting a pitch, as set forth in claim 4, wherein said means for performing includes at least one low-pass filter for extracting said fundamental tones from said first and second series of signals.

7. An apparatus for shifting a pitch acoustic signals expressed in terms of a series of digital signals, wherein said pitch is shifted to an optional pitch using at least one of a compacting and/or expanding of a time axis and cross-fading a fading-in signal with a fading-out signal, comprising:

means for adjusting phase differences;

said means for adjusting including means for detecting phase differences and means for compensating for said phase differences with respect to two time-slipped series of signals at a fade-in side and a fade-out side, that become inputs to said cross-fading;

said phase difference adjusting means including a plurality of adjustment stages;

said plurality of adjustment stages includes a first stage of adjusting phase differences of blocks of two series of signals;

said first stage of adjusting phase differences of blocks including means for obtaining representative values of said two series of signals block by block;

means, responsive to said representative values, for detecting a deviation between said blocks, at which block-by-block phase difference is minimized in said two series of signals;

means for time shifting said series of signals at said fade-in side an amount equivalent to a detected obtained amount of said deviation; and at least a second stage of adjusting a phase difference;

said second stage including means for sampling at least one of said blocks to obtain a further detailed phase difference than those in units of blocks is obtained sample by at least one sample with respect to said two series of signals, said series of signals at the fade-in side of the two series of signals are shifted equivalent to the obtained phase difference; and said cross-fading means being effective after said means for adjusting phase differences completes adjustment of said phase differences.

8. The apparatus for shifting a pitch, as set forth in claim 7, further comprising said means for adjusting phase differences including at least one low-pass filter;

said at least one low-pass filter providing a filtered output of said series of digital signals; and said means for detecting phase differences being effective for detecting phase differences in said filtered output, using a series of signals in a block as representative values of said block.

9. The apparatus for shifting a pitch, as set forth in claim 7, wherein, at least at a part of said means for adjusting phase difference includes:

means, effective when a pitch is raised, to shift a series of signals at said fade-in side to a side where said past signals are used; and means, effective when a pitch is lowered, to shift a series of signals at said fade-in side to a side where said future signals are used.

10. A method for shifting a pitch, in which a pitch of acoustic signals, expressed in terms of a series of digital signals, is shifted to an optional pitch by using a compacting and/or expanding process in terms of a time axis and a cross-fading process, comprising:

a process for adjusting phase differences, which detects phase differences and compensates the same with respect to two time-slipped series of signals at a fade-in side and a fade-out side, that become inputs of said cross-fading process;

said phase difference adjusting process performing said adjusting in at least first and second adjustment stages;

said first adjustment stage adjusting the phase differences, by dividing two series of signals into defined blocks;

obtaining representative values of said two series of signals block by block;

detecting a deviation between said representative values blocks;

selecting a one of said representative value blocks at which block-by-block phase difference is minimized in said two series of signals;

shifting said series of signals at said fade-in side an amount of said deviation; and after said first adjustment stage, said second adjustment stage further adjusting said phase differences using a sample by sample of said two series of signals;

sifting said series of signals at said fade-in side a further amount equivalent to the phase difference in said second adjustment stage; and performing said cross-fading after said adjusting said phase differences is completed.

11. The method for shifting a pitch, as set forth in claim 10, said series of signals are passed through a low-pass filter before determining representative values of said phase differences.

12. The method for shifting a pitch, as set forth in claim 10, wherein, in at least at a part of said phase difference adjusting stages:

when a pitch is raised, a series of signals at said fade-in side are shifted to a side where said past signals are used; and when a pitch is lowered, a series of signals at said fade-in side are shifted to a side where said future signals are used.

* * * * *

UNITED STATES PATENT AND TRADEMARK OFFICE

CERTIFICATE OF CORRECTION

PATENT NO. : 6,909,924 B2
DATED : June 21, 2005
INVENTOR(S) : Yoshinori Kumamoto et al.

It is certified that error appears in the above-identified patent and that said Letters Patent is hereby corrected as shown below:

Title page,
Item [56], References Cited, OTHER PUBLICATIONS, please delete "Applicant's admitted prior art, Figures 8-12, pp.2-6.*". (entry repeated).

Column 12,
Line 19, after "comprising" insert -- : --.
Line 65, delete "sifting" and insert -- shifting --.

Signed and Sealed this

Eighth Day of November, 2005

JON W. DUDAS
*Director of the United States Patent and Trademark Office*